(12) United States Patent
Mamei et al.

(10) Patent No.: US 9,457,778 B2
(45) Date of Patent: Oct. 4, 2016

(54) BRAKING DEVICE FOR AGRICULTURAL MACHINES

(71) Applicants: Eronne Mamei, Modena (IT); Enrico Mamei, Modena (IT); Andrea Mamei, Modena (IT)

(72) Inventors: Eronne Mamei, Modena (IT); Enrico Mamei, Modena (IT); Andrea Mamei, Modena (IT)

(73) Assignee: STUDIO TECNICO 6 M S.R.L., Modena (IT)

( * ) Notice: Subject to any disclaimer, the term of this patent is extended or adjusted under 35 U.S.C. 154(b) by 52 days.

(21) Appl. No.: 14/492,158

(22) Filed: Sep. 22, 2014

(65) Prior Publication Data
US 2015/0084400 A1    Mar. 26, 2015

(30) Foreign Application Priority Data
Sep. 20, 2013   (IT) .............................. MO2013A0256

(51) Int. Cl.
| | |
|---|---|
| B60T 11/21 | (2006.01) |
| B60T 7/20 | (2006.01) |
| B60T 8/17 | (2006.01) |
| B60T 8/24 | (2006.01) |
| B60T 11/18 | (2006.01) |
| B60T 11/20 | (2006.01) |
| B62D 11/08 | (2006.01) |

(52) U.S. Cl.
CPC ................. *B60T 11/21* (2013.01); *B60T 7/20* (2013.01); *B60T 8/1708* (2013.01); *B60T 8/246* (2013.01); *B60T 11/18* (2013.01); *B60T 11/203* (2013.01); *B62D 11/08* (2013.01)

(58) Field of Classification Search
CPC ...... B60T 11/18; B60T 11/203; B60T 11/21; B62D 11/08
USPC .......................................................... 303/9.61
See application file for complete search history.

(56) References Cited

U.S. PATENT DOCUMENTS

| | | | |
|---|---|---|---|
| 2,741,337 | A | 4/1956 | Ziskal |
| 3,640,067 | A | 2/1972 | Ingram |
| 8,727,365 | B2 | 5/2014 | Epple |
| 2003/0071517 | A1 | 4/2003 | Well |
| 2011/0291471 | A1 | 12/2011 | Epple |

FOREIGN PATENT DOCUMENTS

| | | | |
|---|---|---|---|
| DE | 22 53 941 | | 5/1973 |
| DE | 32 43 366 | | 5/1984 |
| DE | 101 45 789 | | 4/2003 |
| EP | 1 459 951 | | 9/2004 |
| FR | 2 450 726 | | 10/1980 |
| GB | 2048184 | A  * | 12/1980 |
| GB | 2 113 786 | | 8/1983 |
| GB | 2 140 516 | | 11/1984 |
| GB | 2 466 066 | | 6/2010 |
| WO | 2005/051743 | | 6/2005 |
| WO | 2011/010245 | | 1/2011 |

OTHER PUBLICATIONS

Italian Search Report dated Jan. 21, 2014, corresponding to the Foreign Priority Application No. MO20130256.

* cited by examiner

*Primary Examiner* — Robert A Siconolfi
*Assistant Examiner* — Vu Q Nguyen
(74) *Attorney, Agent, or Firm* — Young & Thompson

(57) ABSTRACT

A braking device for agricultural machines includes a body which supports in a sliding way at least two thrust elements operatively connectable to relative valves for the braking of a right wheel and a left wheel of a vehicle and associable with respective braking pedals operable by an operator, the thrust elements being mobile along a sliding direction between an idle configuration and a maximum braking configuration. The device includes at least a connection element having at least two connection areas, each being associated in a rotating way with a relative thrust element to connect them reciprocally and to allow the independent operation of the braking pedals, and abutment elements suitable for contacting the connection element during the translation of both the thrust elements to limit their forward movement towards the maximum braking configuration, the connection element and the abutment elements being reciprocally mobile along the sliding direction.

15 Claims, 5 Drawing Sheets

BRAKING DEVICE FOR AGRICULTURAL MACHINES

The present invention relates to a braking device for agricultural machines. It is known that vehicles, such as some agricultural machinery, having two braking pedals suitable for braking in an independent way to the right or left, require high braking pressures to allow blocking the relative wheel and thus obtaining a much reduced curvature radius.

The braking devices of these vehicles generally envisage a body that supports two thrust elements sliding, each of which can be operated by means of a relative braking pedal and operates a relative braking valve.

During vehicle use, the operator therefore intervenes on just one braking pedal to block the relative wheel and thus assist the steering, while he/she intervenes on both pedals to stop the vehicle (so-called "service braking").

A limit of these known devices consists in the difficulty in managing the braking pressure according to the vehicle operating requirements. More in particular, the high pressure used during steering cannot be used during service braking as it would be excessive and could destabilize the vehicle.

If the braking wheels are the only front wheels, their sudden blocking could cause the rear wheels to lift and even overturn the vehicle.

The main aim of the present invention is to provide a braking device for agricultural machines that allows differentiating the braking pressure used to steer the vehicle from that used to slow it down or stop it.

Within this aim, one object of the present invention is to regulate the braking pressure in a mechanical way.

Another object of the present invention is to provide a braking device which allows to overcome the mentioned drawbacks of the prior art within the ambit of a simple, rational, easy and effective to use as well as affordable solution.

The above mentioned objects are achieved by the present braking device for agricultural machines according to the claim 1.

Other characteristics and advantages of the present invention will become better evident from the description of a preferred but not exclusive embodiment of a braking device for agricultural machines, illustrated by way of an indicative, but not limitative, example in the accompanying drawings in which.

Figure 1:
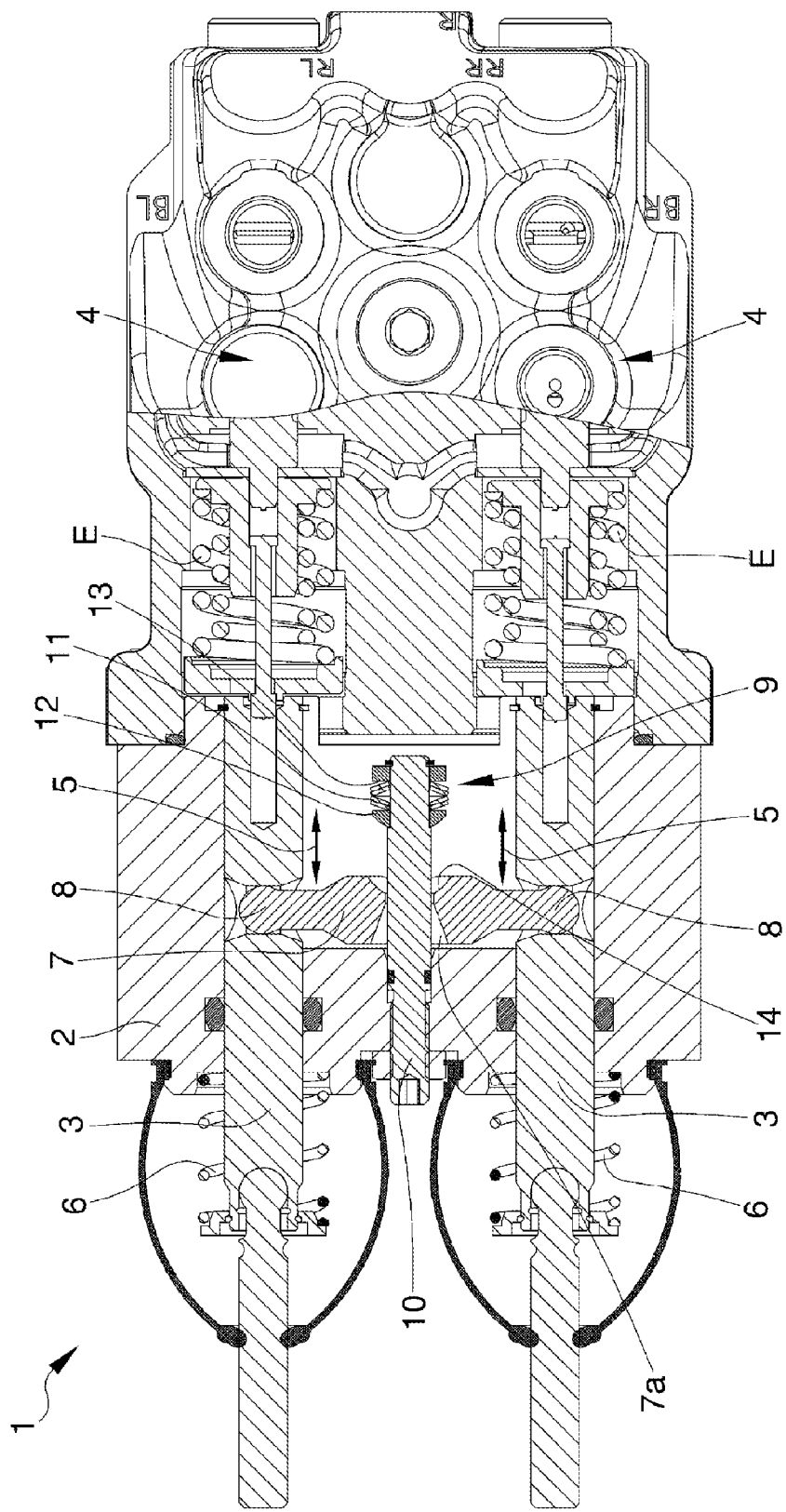
FIG. 1 is a sectional view of a device according to the invention in a first embodiment, with the thrust elements in the idle configuration.

With particular reference to such figures, globally indicated by reference number 1 is a braking device for agricultural machines.

The device 1 comprises a body 2 which supports in a sliding way at least two thrust elements 3 which can be operated by means of relative braking pedals (not shown in the illustrations) which can be operated by an operator and which are suitable for interacting with relative valves to brake at least a right wheel and at least a left wheel of the corresponding vehicle.

It is known that the braking valves are equipped with elastic contrast means E, on which acts the extremity of the relative thrust element 3, and that the corresponding shutter is free to act on the work fluid flow so as to reach from time to time a position of balance between the pressure applied on it by the elastic means E and the pressure of the fluid conveyed to the braking system.

The structure and operation of the braking valves, identified in the illustrations by the reference number 4 are considered as being known to the technician in the field and are not therefore illustrated in detail below.

Each thrust element 3 is mobile in translation between an idle configuration, wherein the corresponding braking valve connects the supply of the work fluid to the drain, and a maximum braking configuration, to which corresponds the maximum braking pressure. The idle configuration and the maximum braking configuration correspond to the end-of-stroke positions of the thrust elements 3, the sliding direction of which is identified in the illustrations by means of the double arrow 5.

During the stroke from the idle configuration towards the maximum braking configuration, each thrust element 3 passes through a plurality of intermediate braking configurations, to which correspond braking pressures which are lower than the maximum producible one.

Between the body 2 and each thrust element 3 elastic means 6 are placed such as, e.g., a helical spring, suitable for contrasting the shift of the thrust elements themselves from the idle configuration towards the braking configuration.

According to the invention, the device 1 comprises at least a connection element 7 having at least two connection areas 8, each of which is associated at least in a rotating way with a relative thrust element 3. The connection element 7 is therefore suitable for reciprocally connecting the thrust elements 3 and at the same time allowing these to operate independently.

Suitably, the connection element 7 is of the rigid type and therefore acts as a rocker arm.

The device 1 also comprises abutment means 9 suitable for contacting the connection element 7 during the translation of both the thrust elements 3 to limit the forward movement of the latter towards the maximum braking configuration. The abutment means 9 and the connection element 7 are reciprocally mobile along the sliding direction 5.

The interaction between the abutment means 9 and the connection element 7 thus allows limiting the braking pressure during the simultaneous operation of the braking pedals (service braking) to a preset value below the maximum achievable one.

The position of the abutment means 9 therefore defines the maximum stroke that can be covered by the thrust elements 3 during service braking and, consequently, also the corresponding value of the braking pressure.

Suitably, the connection element 7 is of the rigid type.

Advantageously, the connection areas 8 correspond to the opposite extremities of the connection element 7 and have a substantially spherical conformation. Such connection areas 8 are inserted within relative seats obtained on each thrust element 3.

The seats within which the connection areas 8 are housed have relative flares suitable for allowing the rotation of the connection element 7.

In a first type of the device in question, to which belong the embodiments shown in the figures from 1 to 4, the abutment means 9 are associated, during use, integral with the body 2. In other words, in this first type, during the operation of the device in question, the position of the abutment means 9 is fixed with respect to the body 2.

More in detail, in this first type, the device 1 comprises at least a guide element 10 associated integral with the body 2 and supporting the abutment means 9. The connection element 7 is fitted sliding on the guide element 10 and is mobile with respect to this by a predefined angle. More in particular, the connection element 7 has, in correspondence to its central portion, a through hole 7*a* through which the guide element 10 is fitted and which has two opposite flares diverging towards the outside suitable for allowing the rotation of the connection element 7 with respect to the guide element itself. The connection element 7 is therefore able to turn with respect to the guide element 10 until the walls of one of the flares come into contact with the outer surface of the guide element 10.

Advantageously, the position of the abutment means 9 is adjustable along the sliding direction 5 with respect to the body 2. More in particular, the abutment means 9 can be screwed onto the guide element 10 or, alternatively, the position of the guide element 10 can be adjusted along the sliding direction 5 with respect to the body 2 (e.g., by means of a threaded connection), in such a way as to allow the adjustment of the position of the abutment means 9 and, therefore, of the limit switch of the connection element 7 during service braking.

In a first embodiment, shown in the figures from 1 to 3, the abutment means 9 comprise at least an elastic element 11 suitable for contrasting the shift of the thrust elements 3 towards the maximum braking position. More in particular, the abutment means 9 comprise at least an abutment element 12 suitable for contacting the connection element 7 and associated with the elastic element 11, such as a spring of desired rigidity, in turn placed between the abutment element 12 and a locator surface 13 integral with the guide element 10. Suitably, one of the above-mentioned flares, and in particular that turned towards the abutment means 9, defines the stop surface 14 against which the abutment element 12 rests following the forward movement of the connection element 7. In this first embodiment, the elastic element 11 permits the further raising of the braking pressure not proportionate to the increase in force applied to the braking pedal for any emergency stops.

In an alternative embodiment (not shown in the illustrations), the elastic element 11 with which the abutment means 9 are equipped is of the pre-compressed type. This further increases, with respect to the first embodiment described above, the force which the operator has to apply to achieve the subsequent increase in braking pressure.

Figure 4:
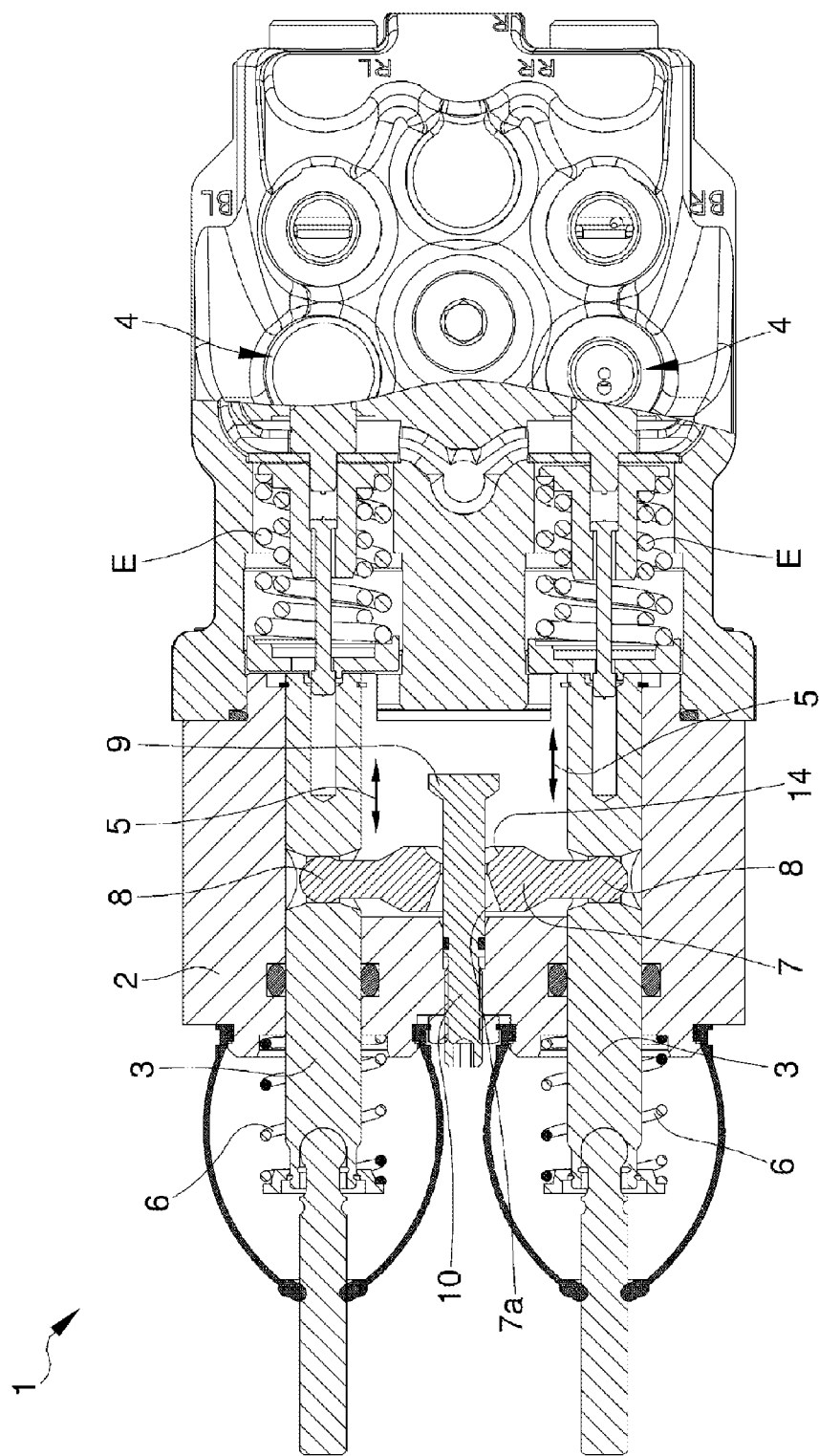
FIG. 4 is a sectional view of a device according to the invention in a second embodiment, with the thrust elements in the idle configuration.

In a second embodiment, shown in FIG. 4, the abutment means 9 are of the fixed type such as a protrusion defined by the guide element 10 or, alternatively, by an elastic ring keyed on the guide element itself.

Figure 5:
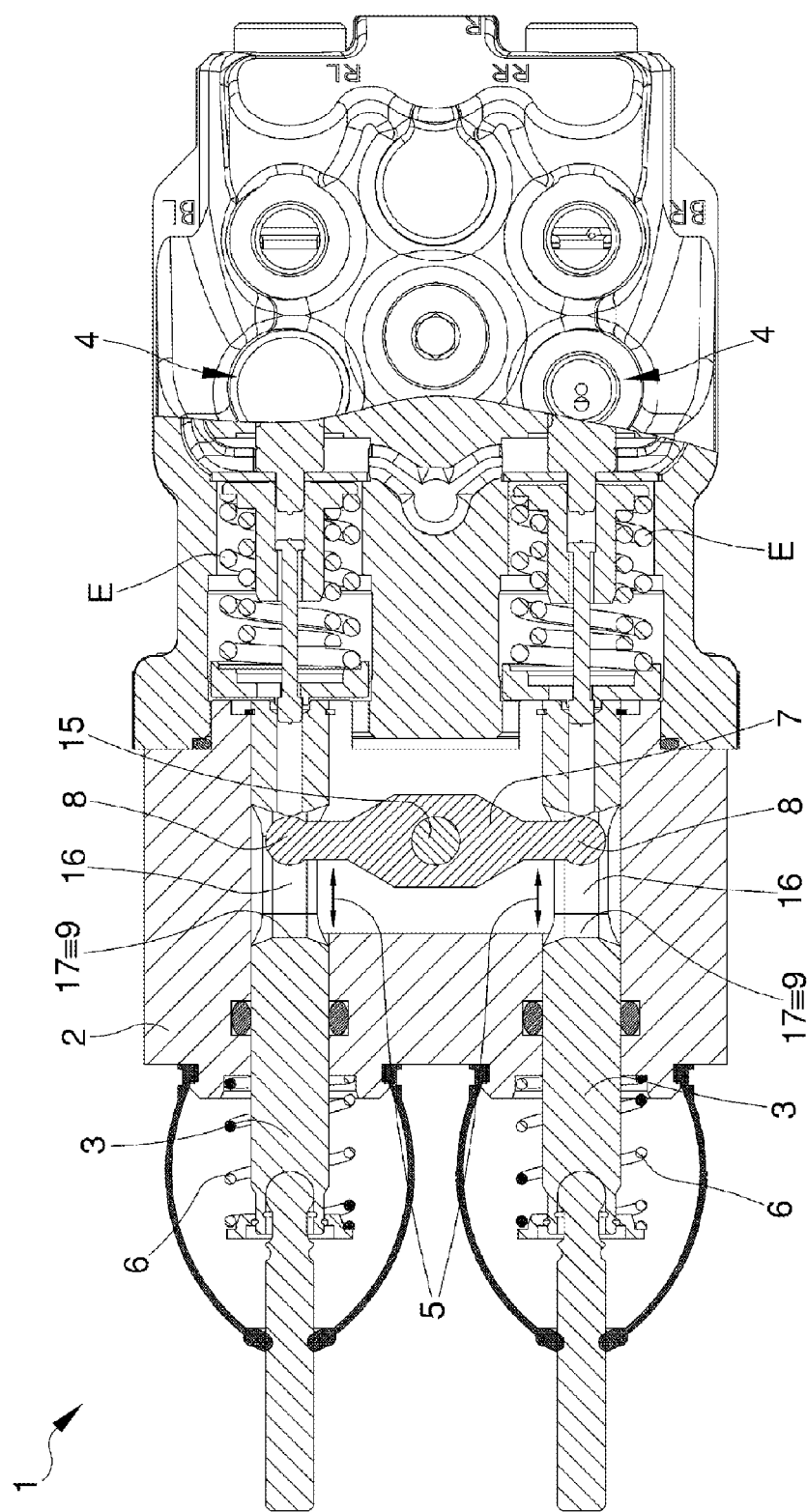
FIG. 5 is a sectional view of a device according to the invention in a further embodiment, with the thrust elements in the idle configuration.

In a second type of the device forming the subject of this invention, shown in FIG. 5, the connection element 7 is blocked in rotation with respect to the body 2 and has a rotation fulcrum 15 placed between the connection areas 8. In this further embodiment, the abutment means 9 are defined by the thrust elements 3. Advantageously, the thrust elements 3 have relative housing seats 16 with elongated shape and inside which the connection areas 8 are housed sliding. Such housing seats 16 define the abutment means 9 and, more in particular, have a relative abutment surface 17 suitable for contacting the connection areas 8 following the forward movement of the relative thrust element 3 towards the braking configuration. In this second type of braking device, it is therefore the abutment means 9 which move along the sliding direction 5 with respect to the connection element 7.

It therefore appears evident how in this second type, it is the length of the housing seats 16, and more in particular the position of the relative abutment surfaces 17, which determines the maximum stroke that can be covered by the thrust elements 3, and therefore the corresponding pressure value, during service braking.

The operation of the present invention is as follows.

Figure 2:
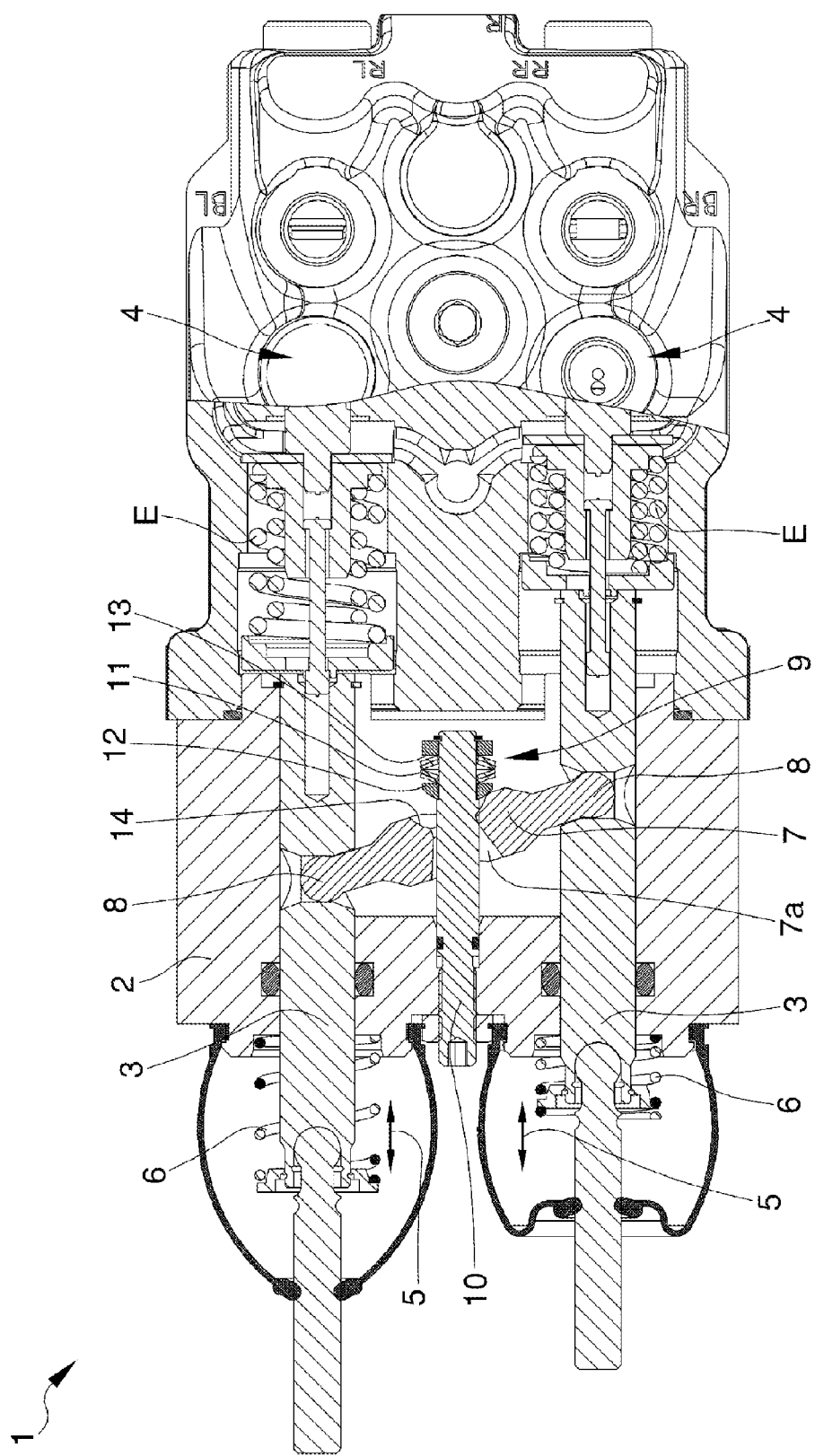
FIG. 2 is a sectional view of the device of FIG. 1 with a thrust element in the maximum braking configuration.

In the first described type of braking device according to the invention, following the operation of just one of the braking pedals of the vehicle, the relative thrust element 3 is moved from the idle configuration (shown in the FIGS. 1 and 4, of the first and the second described embodiment respectively) towards the maximum braking configuration, in contrast to the relative elastic means 6. Such shift causes the rotation of the connection element 7 around an axis passing through its median area fitted around the guide element 10 (as shown in FIG. 2) and therefore also the rotation of the connection areas 8 inside the relative seats.

By individually operating each braking pedal, the relative thrust element 3 can therefore cover the entire stroke and reach the maximum braking configuration.

Figure 3:
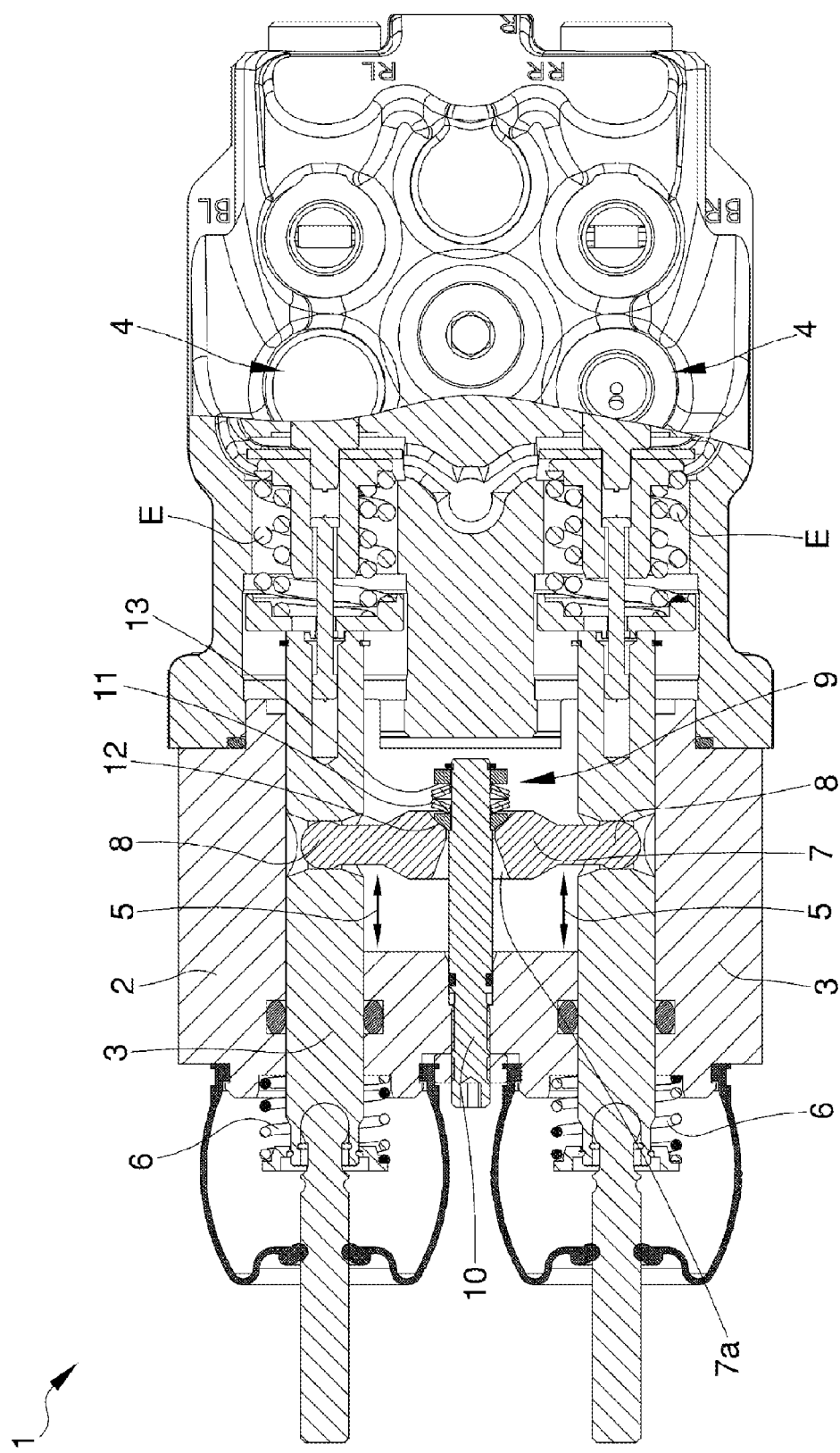
FIG. 3 is a sectional view of the device of FIG. 1 with the connection element resting against the abutment means.

In the case, instead, of the operator operating both braking pedals together, the thrust elements 3 move towards the maximum braking configuration, also dragging the connection element 7, which therefore moves with respect to the guide element 10. The shift of the thrust elements 3 is interrupted the moment the connection element 7 contacts the abutment means 9, as shown in FIG. 3. It is therefore easy to appreciate how, by regulating the position of the abutment means 9, is it possible to intervene on the maximum stroke which the thrust elements 3 can cover during service braking (i.e., when both brake pedals are operated by the operator), and consequently on the maximum braking pressure applicable in this operating condition.

In the event of the operator initially operating a first braking pedal, bringing the relative thrust element 3 to the end-of-stroke position, and subsequently also intervening on the other (while maintaining the first one in operation), the thrust element 3 corresponding to the second operated pedal will have free stroke until the connection element 7 contacts the abutment means 9, after which it applies a force on the first thrust element 3 such as to cause it to move towards the idle configuration so as to balance the braking pressure value corresponding to the second operated thrust element 3.

As already said above, in the event of the abutment means 9 also comprising the elastic element 11, the latter permits making mobile under load the stop of the connection element 7, which can therefore complete a further stroke to increase the braking pressure. It appears evident how the force that has to be applied by the operator to compress the elastic element 11 depends on the rigidity and any preloading of the elastic element itself.

The second type of braking device forming the subject of the present invention described above envisages that the connection element 7 be blocked in translation with respect to the body 2 and, therefore, that it be free to rotate around its central fulcrum 15.

More in particular, following the operation of a braking pedal and the consequent shift of the relative thrust element 3, the connection element 7 rotates around its own central fulcrum 15 and its connection area 8 associated with such thrust element 3 moves inside the relative housing seat 16.

In the event of the operator operating both braking pedals at the same time for service braking, the thrust elements 3 move towards the maximum braking configuration. During such shift, both the connection areas 8 slide inside the relative housing seats 16 until they come into contact with the corresponding abutment surfaces 17. Because, as has been said above, the connection element 7 can rotate around its own fulcrum 15 but is blocked in translation, once the abutment surfaces 17 contact the connection areas 8 the thrust elements 3 are consequently blocked as regards their shift towards the relative end-of-stroke position.

In this second type of braking device, it is therefore the position of the abutment surfaces 17 that defines the maximum stroke which the thrust elements can cover during service braking.

It has in practice been ascertained how the described invention achieves the proposed objects and in particular the fact is underlined that the braking device forming the subject of the present invention permits automatically regulating the maximum braking pressure according to the operating conditions of the vehicle, i.e., depending on whether the latter is in steering or braking phase.

The invention claimed is:

1. Braking device (1) for agricultural machines comprising:
    a body (2) which supports in a sliding way two thrust elements (3) operatively connectable to respective valves (4) for braking of a right wheel and of a left wheel of a vehicle and associable with respective braking pedals that can be operated by an operator, said two thrust elements (3) being mobile along a sliding direction (5) between an idle configuration and a maximum braking configuration;
    a connection element (7) having two connection areas (8), each of which is associated at least in a rotating way with a respective said thrust element (3) to connect the thrust elements (3) reciprocally and to allow independent operation of the braking pedals; and
    abutment means (9) for contacting said connection element (7) during simultaneous translation of both said thrust elements (3) to limit movement of said thrust elements towards the maximum braking configuration, said connection element (7) and said abutment means (9) being reciprocally mobile along said sliding direction (5).

2. Device (1) according to claim 1, wherein said connection element (7) is rigid.

3. Device (1) according to claim 1, wherein said abutment means (9) are integrally associated, during use, with said body (2).

4. Device (1) according to claim 3, wherein a position of said abutment means (9) is adjustable along said sliding direction (5) with respect to said body (2).

5. Device (1) according to claim 3, further comprising a guide element (10) integrally associated with said body (2) and supporting said abutment means (9), said connection element (7) sliding on said guide element (10) and being mobile in rotation with respect to said guide element by a predefined angle.

6. Device (1) according to claim 1, wherein said abutment means (9) are fixed.

7. Device (1) according to claim 1, wherein said abutment means (9) comprise an elastic element (11) for resisting movement of said connection element (7) towards said maximum braking configuration.

8. Device (1) according to claim 7, wherein said elastic element (11) is pre-compressed.

9. Device (1) according to claim 1, wherein said connection element (7) is blocked in translation with respect to said body (2) and has a rotation fulcrum placed between said connection areas (8) and wherein said abutment means (9) are defined by said thrust elements (3).

10. Device (1) according to claim 9, wherein said thrust elements (3) have relative housing seats with an elongated conformation and inside which are housed said connection areas (8), said housing seats defining said abutment means (9).

11. Device (1) according to claim 10, wherein said housing seats define an abutment surface suitable for contacting said connection areas (8) following the forward movement of the relative thrust element (3) towards said maximum braking configuration.

12. Device (1) according to claim 2, wherein said abutment means (9) are integrally associated, during use, with said body (2).

13. Device (1) according to claim 4, further comprising a guide element (10) integrally associated with said body (2) and supporting said abutment means (9), said connection element (7) sliding on said guide element (10) and being mobile in rotation with respect to said guide element by a predefined angle.

14. Device (1) according to claim 2, wherein said connection element (7) is blocked in translation with respect to said body (2) and has a rotation fulcrum placed between said connection areas (8) and wherein said abutment means (9) are defined by said thrust elements (3).

15. Device according to claim 1, wherein the connection element (7) directly contacts both said thrust elements (3).

* * * * *